(No Model.) 4 Sheets—Sheet 1.

A. GRAEMIGER.
PROCESS OF AND APPARATUS FOR DYEING, SCOURING, BLEACHING, AND OTHERWISE TREATING YARNS IN COPS.

No. 368,715. Patented Aug. 23, 1887.

Fig. 1.

Witnesses
P. F. Eagle.
John Holley

August Graemiger
Inventor
By his Attorneys,
N. C. Strawbridge
Bonsall Taylor

UNITED STATES PATENT OFFICE.

AUGUST GRAEMIGER, OF CROMPTON, ASSIGNOR TO THE CROMPTON COMPANY, OF CROMPTON AND PROVIDENCE, RHODE ISLAND.

PROCESS OF AND APPARATUS FOR DYEING, SCOURING, BLEACHING, AND OTHERWISE TREATING YARNS IN COPS.

SPECIFICATION forming part of Letters Patent No. 368,715, dated August 23, 1887.

Application filed April 14, 1887. Serial No. 234,763. (No model.)

*To all whom it may concern:*

Be it known that I, AUGUST GRAEMIGER, a citizen of the Republic of Switzerland, domiciled at the village of Crompton, in the town of Warwick, in the county of Kent, and State of Rhode Island, have invented certain Improvements in Processes of and Apparatus for Dyeing, Scouring, Bleaching, and otherwise Treating Yarns in Cops, of which the following is a specification.

The invention is of general applicability in dyeing, mordanting, bleaching, steaming, scouring, washing, drying, or otherwise treating yarns of cotton, silk, wool, worsted, or other animal or vegetable fiber, in the form of cops, or in kindred compact forms, by either sucking or forcing liquid dyes, or other liquids used in dyeing, mordanting, bleaching, scouring, steaming, or otherwise treating the cops, through the cops when mounted upon hollow perforated tubes, skewers, or injection spindles, which extend respectively through the cops and render every portion of each cop subject to the action of said liquids.

The foregoing operations broadly as such, and as separately conducted in the same or in different machines, are not novel with me, and attempts have heretofore been made, thereby, to practically dye, bleach, and otherwise treat, cotton and other yarns in cop and other compact forms. So far, however, as my knowledge extends, the practice has never been practically possible or successfully conducted upon a commercial scale.

My invention being, as stated, of general applicability for dyeing, bleaching, scouring, mordanting, drying, and otherwise treating yarns of various kinds in cop and other compact forms,—its object is the provision of means whereby all of the cops composing any given series or succession, regular or irregular, of cops or of tiers or groups of cops, may, in the selected series or succession,—as to each cop, tier, or group, successively, but as to the entire series or succession of given cops, tiers, or groups collectively,—be contemporaneously or simultaneously subjected each to its appropriate step of the contemporaneously conducted successive steps composing the selected process, of any one of which processes, however, continuity of operation in a greater or less degree, is the especial desideratum and the salient characteristic.

To the foregoing ends my invention embraces apparatus having the capacity for performing or carrying out any one of several cognate processes or methods of treatment of yarn in cops or kindred compact forms, and apparatus, moreover, so constituted as to be readily convertible into, or applicable for use as, any one of several cognate yet distinct devices, respectively susceptible of the performance of a particular kind of work, that is to say of the practice of some one of the said several cognate processes, hereinafter detailed, all of which, as processes or modes of treatment, are novel with me.

Broadly stated, my invention, so far as processes are concerned, as applied to dyeing, mordanting, bleaching, scouring, steaming, washing, or otherwise similarly treating by the impregnation of liquids, yarn in cops, comprehends, first, the contemporaneous but distributive subjection of the cops composing a series each in turn to its appropriate step of the following contemporaneously-conducted successive steps or operations, namely: first, saturation or impregnation by sucking or forcing the selected liquids through given cops; and, second, substitution of fresh cops to be charged for given charged cops.

Similarly, also, my invention, as applied to the operations of impregnation above mentioned, comprehends, second, the subjection of the cops in the manner above stated, to the following successive steps or operations; first, saturation or impregnation by sucking or forcing the selected liquid through given cops; second, liquid-exhaustion by forcing or sucking air or other suitable fluid through given charged cops; and, third, substitution of cops to be charged and liquid-exhausted for given charged and liquid exhausted cops.

Similarly, again, my invention, as applied to exhausting surplus liquid from charged cops, comprehends, third, the subjection of cops, in the manner above stated, to the following successive steps or operations; first, liquid-exhaustion by forcing or sucking air or other suitable fluid through the cops; second, substitution of cops to be liquid-exhausted for given liquid-exhausted cops.

Similarly, again, as applied to operations of dyeing with easily oxidizable liquid dyes, my invention comprehends, fourth and fifth, the subjection of the cops in the manner above stated with reference to the first two operations which involve impregnation with liquids,— and in connection either with the two steps of saturation and substitution which are involved in the practice of the first of my foregoing processes, or else in connection with the three steps of saturation, liquid-exhaustion, and substitution which are involved in the second of my foregoing processes,—to a preliminary step of air exhaustion before saturation or impregnation proper, by sucking or forcing air from out given cops to be charged or saturated.

My invention further comprehends apparatus for conveniently effectuating the five several processes which respectively reside in the practice of the foregoing respectively recited connected steps or operations.

Apparatus conveniently and cheaply embodying my invention so far as it is concerned with apparatus, and adapted to effectuate the separate practice of any one, and consequently of all of the processes hereinbefore referred to, is represented in the accompanying drawings and described in this specification, the particular subject matter, so far as said apparatus is concerned, as well as the particular subject matter in which my processes reside being hereinafter definitely stated.

In the drawings.

Similar letters of reference indicate corresponding parts.

In the drawings, A represents a tank, vat, or other recipient, for containing a given quantity of any selected liquid. In all operations in which charging or impregnation is not essential, the tank performs the office simply of a fixed supporting framework, and not that of a liquid recipient.

B is what I term the carrier body, it being, referably to the fixed tank and moving cop carrier, simply a fixed device conveniently subserving the double purpose, first, of being a fixed body with reference to which the cop carrier has movement, and, second, of being a body containing or embodying, or of being a supporting device serving conveniently to present to the perforations in the cop carrier, both the mouths of chambers of the active conduits, and the dead face.

C is the cop carrier, a device which, as its name implies, carries the cops,—which is perforated referably to the points of and means for attachment of the cops,—and which has such movement, referably to the carrier body and to the tank, that its perforations are in predetermined continuing sequence placed in communication, preferably through perforated injection spindles, with the axial apertures of the cops on the one hand, and with the conduit mouths and the dead face upon the other hand.

D is a charging conduit in exterior communication with a suction or pressure pump, and interiorly or as to its mouth, conveniently through the intermediation of the carrier body, in communication for the time being with given perforations in the cop carrier.

E is an exhausting conduit in exterior communication with a suction or pressure pump, and interiorly or as to its mouth, conveniently also through the intermediation of the carrier body, in communication for the time being with other given perforations in the cop carrier.

$B^\times$ is a special form of dead face, which happens to be a closed chamber formed upon or embodied in the peripheral carrier-surface of the carrier body, but which, referably to the cop carrier and as a dead face generically considered, is simply a, in any convenient manner suitably formed, blank or unchambered segment of the periphery of the carrier body, or a gap or opening in said periphery, or an open chamber in said periphery, so located above the level of any liquid in the tank as to act in connection with cops above said level, calculated, in the preferred mode of employing the apparatus, for the time being to act in connection with yet other give perforations of the cop carrier, and permit of the removal, at a period subsequent to their treatment, of the cops applied to said perforations and of the substitution of others in their stead.

Premising that the tank, the perforated cop carrier, the charging conduit and the exhausting conduit, when either or both of said conduits is active or in use,—whatever conduit is used for air-exhaustion, when such operation is a step of a process being practiced,—the dead face,—and, lastly,—but as a device of convenience merely for the purpose of conveniently presenting to given perforations of the cop carrier, the dead face, the terminal portion or mouth of the charging conduit, and the terminal portion or mouth of the exhausting conduit, when either or both of said conduits is in use, and the terminal portion of such conduit as happens to be used for air-exhaustion, (and as a device, moreover, with reference to which the carrier is conveniently arranged to rotate,) the carrier body, aforesaid,—are (irrespective of their form, proportions, or mechanically considered relative arrangement,) the vital elements, members, or instrumentalities of an apparatus embodying my invention,— it is proper to distinctly state that, while the special form and construction and the special relative arrangement of the aforesaid elements represented in the drawings and hereinafter at length described, is the cheapest and most convenient construction, form, and arrangement of which I now have knowledge,—I do not restrict myself to it,—my invention, so far as apparatus is concerned, being broad enough to comprehend other constructions, forms, relative arrangements, or combinations, of the foregoing recited essential elements.

Having now explained what elements are essential, it is proper also, briefly, to state certain essential conditions of relationship of the aforesaid elements, and to contradistinguish therefrom the non-essential conditions:—Thus, while, except in the employment of the apparatus for liquid exhaustion only, it is essential that the cop carrier should be capable of such rotation relatively to a tank containing liquid, as will, during a part of its said rotation, occasion the immersion in liquid in the tank of cops carried by it,—it is immaterial how, in what direction, or to what extent, such a rotation be effected, and whether it be slowly continuous, or, as is preferable, intermittent,—or again, in certain operations, whether it be oscillatory, that is to say an incomplete rotation first in one direction and then in another. Thus, again, while it is essential that the cop carrier should be perforated and should be adapted to be supplied with removable cops,—it is immaterial how the perforations are formed or what form or arrangement they assume, and how the cops are applied and removed. Thus, again, while it is essential, when charging, either alone or in connection with other operations, is a step of the process for the time being under practice, that a charging conduit should act to conduct liquids to or from given perforations of the cop carrier in communication, as stated, with given cops,— and that a liquid-exhausting conduit, when liquid exhaustion either alone or in connection with charging, is a step of the process for the time under practice, should similarly act to conduct air to or from given cops,—it is immaterial through the medium of what form of discharging orifice, mouth, or other aperture adapted to register or align itself for the time being with the perforations, such conduit or conduits do so act. Thus, again, while it is essential that there should be a segmental area of the carrier body subserving the purpose of a dead face, generically considered, being, moreover, for processes involving the use of liquids in the tank, an area located above the level of any liquid employed, the function of which is to permit of the presentation for removal of their cops, of given perforations cut off from communication either with the liquid charging instrumentality alone,—or with the liquid charging instrumentality when employed in connection with other steps of a process of which impregnation is a step,—and essential that it should be so relatively placed with reference to the cop-carrier that the perforations in connection with which it acts should be only such as are for the time being in communication with cops above the level of any liquid in the tank and as have been subject to the action of saturation,—it is immaterial what specific form such dead face, as such, assume, or how it be constructed or embodied.

The apparatus which is represented in the drawings, and which is such a one as I prefer to employ because it is equally well adapted to effectuate the process which comprises charging and substitution,—or the process which comprises charging, liquid-exhaustion, and substitution,— or the process which comprises liquid exhaustion and substitution,—or the process which comprises air-exhaustion, dyeing, and substitution,— or the process which comprises air-exhaustion, dyeing, liquid-exhaustion, and substitution,—all of which processes, as hereinbefore stated, my invention comprehends,—is of the following construction, and comprehends all of the elements which are necessary to the conduct or practice of any one of the foregoing processes, and consequently of that one which involves the greatest number of steps, although, as hereinafter explained, in the practice of such of the processes as involve the lesser numbers of steps certain of the elements of the said apparatus are inert or for the time being thrown out of action.

The tank A is, as stated, a fixed receiving vessel preferably of such form and strength as to itself constitute or act as the frame-work of the entire apparatus, that is to say, as a frame-work with reference to which the carrier body is fixedly secured.

The carrier body, B, is preferably a casting, conveniently, but by no means necessarily, possessing the form of the frustum of a hollow cone closed in the plane of its vertex by a web or head $b$, and open in the plane of its base. This body is conveniently formed or equipped with a supporting rod $b^\times$ extending, preferably axially, from the outside surface of its head;—and also formed or equipped with a pipe or conduit which I term the body tube $E^\times$, which is part of the exhausting conduit, and which extends, preferably axially, backward from the inside surface of its head;—and further formed or equipped with a pipe or conduit which I term the body tube $D^\times$, which is part of the charging conduit, and which, lying, preferably, in parallelism with the body tube $E^\times$, and close to the peripheral inner surface of the walls of the body, similarly extends backward from the inside surface of its head.

The carrier body as an entirety is fixedly supported referably to the tank, preferably with its axis in a horizontal plane, by the aid of the supporting rod and the two body tubes, by any preferred means, but conveniently by bolts and nuts, as shown in the drawings.

D is a charging conduit, preferably fixedly connected with the tank by being passed through an aperture in one of its walls, and threaded into or otherwise permanently and integrally connected with the body tube $D^\times$. This charging conduit leads to or is exteriorly in direct communication with a suction or pressure pump of any preferred character, which is adapted either to suck or to force any desired liquid through the conduit, for the saturation, impregnation, or charging of given cops.

E is an exhausting conduit, preferably fixedly connected with the tank by being passed through an aperture in one of its walls, and threaded into or otherwise permanently and integrally connected with the body tube $E^\times$. This exhausting conduit leads to or is exteriorly in direct communication with a suction or pressure pump of any preferred character, which is adapted either to suck or to force air, or other fluid employed as a liquid-exhausting medium, through said exhausting conduit.

I have not represented in the drawings the pumps referred to, for the reason that it is not necessary to an understanding of the invention, the pumps being simply, as stated, of any preferred and well known character, and there being no connection other than those which a competent mechanic would naturally employ.

The walls, that is to say the peripheral carrier surface, of the carrier body are of sufficient thickness to permit of there being formed in them, preferably in the casting of the body, certain exterior peripheral chambers, depressions, or compartments, each independent of the other. The principal chambers in the carrier body represented are the charging chamber $d$ and the liquid-exhausting chamber $e$, the said chambers being the terminal portions or mouths, respectively, of the charging conduit and of the exhausting conduit.

The charging chamber is, in the mounting of the carrier body, the chamber lowermost within the tank, and is, as shown, a double chamber, or one having two compartments one of which lies upon each side of the plane of the vertical diameter of the body, which extends on each side up to a short distance below the plane of the horizontal diameter of said body.

The charging conduit, is in communication with the charging chamber, conveniently through the intermediation of a branch tube $d^\times$ formed as a part of the casting of the carrier body, and serving to place the charging conduit, through its terminal body tube $D^\times$, in common communication with both compartments of the aforesaid charging chamber.

Figure 1:
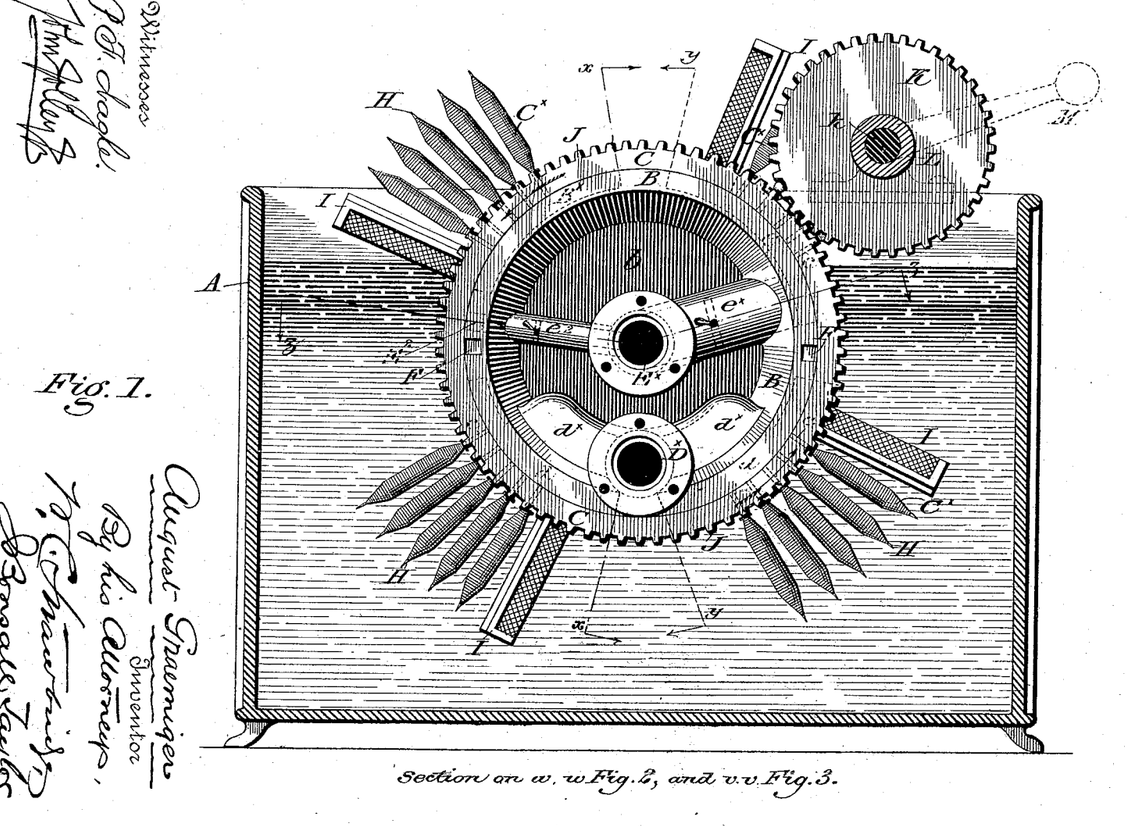
Figure 1 is a side elevation of the entire machine,—section through the tank A being supposed in the plane of the dotted line $w$—$w$ of Fig. 2, and also in the plane of the dotted line $v$—$v$ of Fig. 3.
Figure 2:
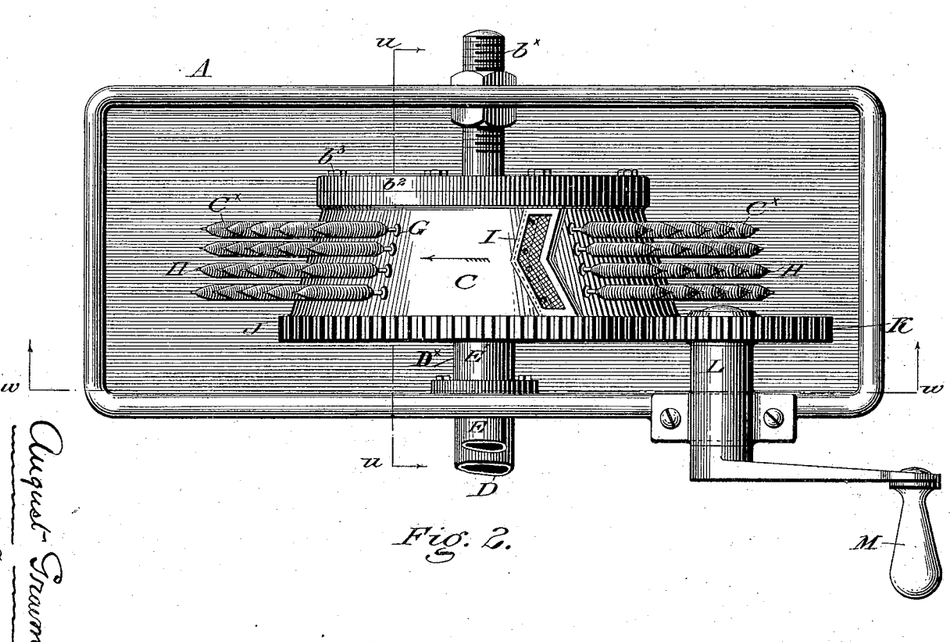
Fig. 2 is a top plan view of the machine represented in Figs. 1 and 3.
Figure 5:
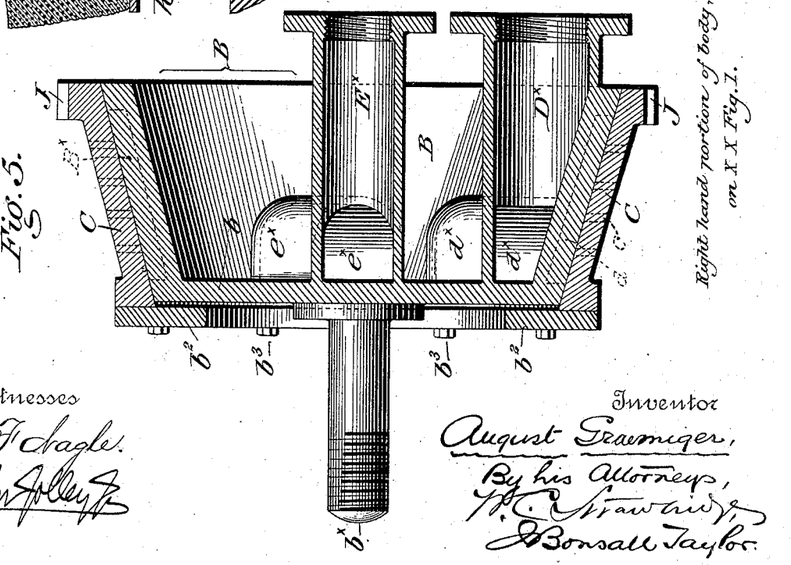
Fig. 5 is a central, vertical, sectional elevation through the carrier body in a central vertical plane terminating in planes of the dotted line $x$—$x$ of Fig. 1, that portion of the body which is represented being, of course, the right hand portion of said body as shown in Fig. 1.
Figures 6, 7:
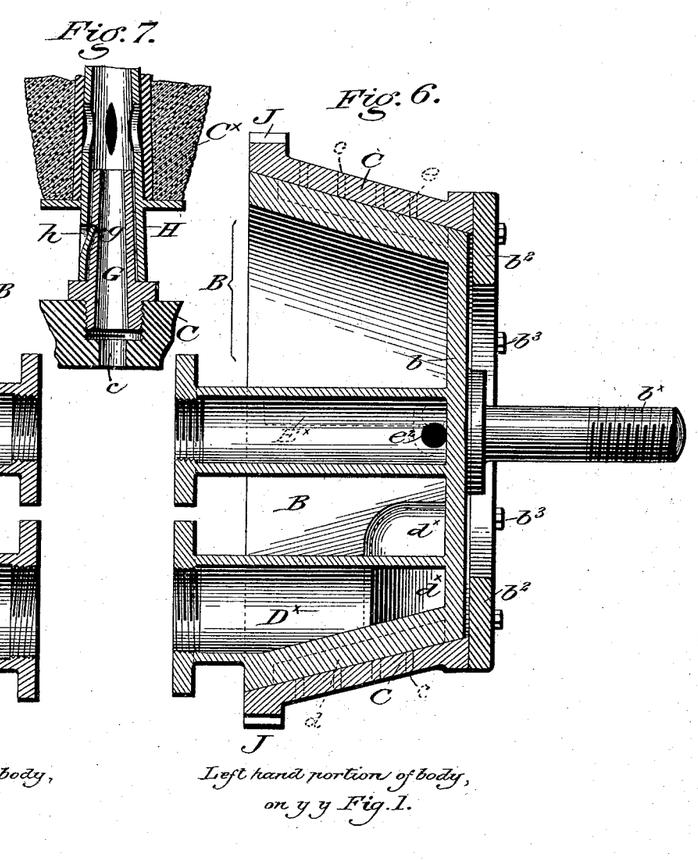
Fig. 6 is a central, vertical, sectional elevation through the carrier body in a central vertical plane terminating in planes of the dotted line $y$—$y$ of Fig. 1, that portion of the body which is represented being, of course, the left hand portion of the said body as shown in Fig. 1.
Fig. 7 is a fragmentary, central, sectional, magnified detail of a portion of the cop carrier, and of one of its applied nipples, illustrating also a portion of a cop and its perforated spindle in place upon said nipple.

It is simply an incident of construction that the charging chamber has two compartments, it being preferable as an expedient of manufacture to leave an intermediate peripheral surface, indicated in Fig. 1 and shown in Figs. 5 and 6, between the compartments of said chamber, to serve as an additional peripheral bearing surface for the cop carrier and as a strengthening rib which happens also to constitute the under portion of the body tube $D^\times$.

The liquid-exhausting chamber $e$, considered with reference to the mounting of the carrier body within the tank as shown in Fig. 1, is preferably formed within the right hand upper quarter portion of the body, or that portion which is located in the upper portion of the tank and above the level of any contained liquid. This chamber is not in communication with the charging chamber,—considered with reference to the direction of travel of the cop carrier, lies beyond said chamber,—and necessarily opens above the level of any liquid in the tank. The liquid-exhausting chamber is in communication with the exhausting conduit conveniently through the intermediation of a branch tube $e^\times$ formed as a part of the casting of the carrier body, and serving to place the exhausting conduit, through its terminal body tube $E^\times$, in communication with the aforesaid liquid-exhausting chamber. The branch tube $e^\times$ of the exhausting conduit is conveniently provided with a valve or cock of any preferred character (for simplicity of representation shown in dotted lines), by means of which the liquid-exhausting chamber may, at will, be cut off from communication with the exhausting pump.

$e^2$ is a supplemental branch tube, being preferably a part of the casting of the carrier body, running, in a direction almost opposite to that in which the branch tube $e^\times$ runs, into an air-exhausting chamber $E^2$, located within and extending transversely across the external peripheral surface, or in a direction of the breadth, of the carrier body, between the dead face and the charging chamber,—and serving, for a purpose hereinafter explained, when desired, to place said air-exhausting chamber in communication with the exhausting conduit. This supplemental branch tube $e^2$ of the air-exhausting chamber is, as in the case of the branch tube of the exhausting conduit, conveniently provided with a valve or cock of any preferred character, also shown in dotted lines, by means of which the air-exhausting chamber can, at will, be cut off from communication with the pump in connection with which it operates.

All of the foregoing chambers shown have top and bottom or edge boundaries, being the unchambered or unrecessed circumscribing portions of the external peripheral surface of the carrier body, upon which surface the cop carrier is mounted and rides, and are laterally divided from each other by transversely extending unchambered portions of the aforesaid external peripheral surface.

Instead of making the chambers referred to in the form of extending recesses, it is, as is apparent, quite possible to make them as a series of minor chambers or channels or perforation through the carrier body, in communication upon the one hand with the conduits the mouths of which they would in such case collectively constitute, and on the other hand adapted to register with given perforations in the cop carrier.

Lying, considered with reference to the direction of movement of the cop carrier, beyond the liquid-exhausting chamber and intermediately between the liquid-exhausting chamber and the charging chamber, is, in the form of carrier body depicted, a peripheral exterior chamber of said carrier body which I specifically designate "the dead face" $B^\times$, and which is in communication with neither the charging nor the exhausting conduits, but, referably to the cop carrier, is simply a blank surface, (preferably, as stated, however, for convenience in the casting of the carrier body, in the form of a closed chamber,) calculated for the time being to present itself to such perforations of the cop carrier as, in the movement of said carrier, happen to come over it. This dead face, generically considered, is not necessarily a chamber, and may, as stated, be simply a continuous portion of the peripheral exterior surface of the body, or a segmental opening in said body.

It is also entirely possible to employ the mouth of the exhausting conduit, or the peripheral area of the carrier body adjacent thereto and above the level of any liquid contained in the tank, as the dead face, generically considered;—it being manifestly apparent that it is possible to perform the operation of substituting fresh or untreated cops for liquid-exhausted cops over the mouth of the exhausting conduit and even while the pump in exterior communication with said conduit continues in action, as the operation of the said pump could in no wise affect the said operation of substitution. Such use, however, of the said mouth of the exhausting conduit as a dead face is not desirable, because, as is obvious, the operation of the apparatus would be much slower, as it would be necessary to delay the act of substitution until the act of liquid-exhaustion had been performed. I simply instance the foregoing possibility of the apparatus the better to explain that the dead face proper is any portion of, or region referable to, the carrier body lying above the level of any liquid contained in the vat with reference to which said carrier body is mounted.

In the claims the term "a dead face" is used in a generic sense and not as restricted to the special dead face $B^\times$.

F F are two transversely extending dye slots, notched through or channeled out of the peripheral exterior surface of the carrier body, one between the dead face or, more strictly, the air-exhausting chamber, and the charging chamber, and the other between the charging chamber and the liquid-exhausting chamber. These slots, which in the mounting of the carrier body lie considerably below the level of the liquid in the tank, being open at both the vertex and the base of the body, are constantly full of the liquid in the tank, and serve as liquid packings between the charging and the air-exhausting chambers, and between the charging and the liquid-exhausting chambers. These slots are of especial importance in the operation of dyeing with indigo white solution, and serve as safeguards to prevent suction of air by the charging pump, when employed as a suction device—which is its preferable employment, from the air-exhausting or the liquid-exhausting chambers into the charging chamber. Of course, if it were possible to maintain under continuing wear a perfect fit of the cop carrier upon the carrier body, that is to say a fit so close that no air could get between them, these slots would not be important; but as in practice, even with the best construction and most careful adjustment to compensate for wear, interspaces do come to exist between the body and the carrier, these slots, containing, as they do, liquid packing, become of importance as safeguards to the charging chamber in the practice of indigo dyeing, in which operation they are essential to prevent the suction of the charging pump from sucking air, through the interspaces between the body and the carrier, from the liquid-exhausting and air-exhausting chambers into the charging chamber, with the result of oxidizing the indigo, depositing the insoluble indigotine, clogging the fibers of the cops, and preventing the effectual circulation of the dyestuff through said cops. In other words, in indigo dyeing, these slots open a free passage for the white indigo solution in the tank to permeate through the crevices or interspaces between the carrier and body, into the charging chamber, and by its presence to fill said interspaces and exclude the entrance or passage of air. These slots are also of advantage, in that, as there is always, when the exhausting pump is used as a suction device, a rarified condition or vacuum pressure in the liquid-exhausting chamber and interspaces between the carrier and the body in the area between the charging and liquid-exhausting chambers, their absence would permit of the drawing of the dyestuff from the charging chamber into the liquid-exhausting chamber, a thing undesirable in practice.

Having now described the construction of the carrier body, and how that it is a convenient device for the purpose of conveniently presenting to given perforations of the cop carrier, the dead face, the terminal portion or mouth of the charging conduit, and the terminal portion or mouth of the exhausting conduit, and the mouth of whatever conduit operates in connection with the air-exhausting chamber,—and a device, moreover, with reference to which the carrier is conveniently arranged to rotate,—C is the cop carrier, an annular conical plate, band, or strap, more exactly described as the frustum of a hollow cone, mounted for rotary movement upon the exterior peripheral surface of the body, which it is conformed to fit, and maintained in place upon said body by an annular flange or cap $b^2$ secured by bolts $b^3$ to the web or head $b$ of the carrier body.

Figure 3:
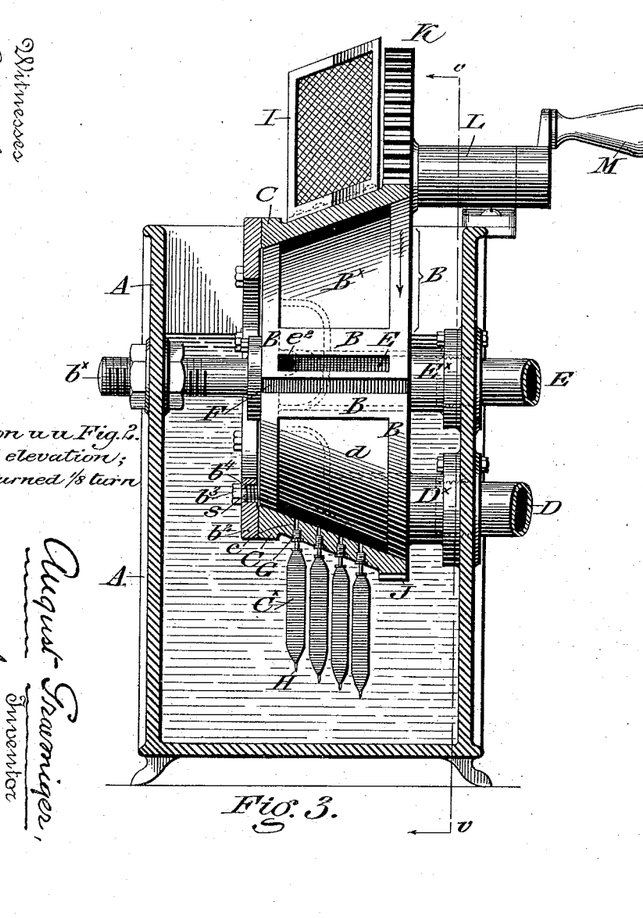
Fig. 3 is an end elevation of the machine represented in Figs. 1 and 2, section through the tank being supposed in the plane of the dotted line $u$—$u$ of Fig. 2, and the carrier body being shown in transverse or end elevation, while the carrier is shown in central vertical sectional elevation, and is supposed to have received an eighth turn in rotation, or such a turn beyond the position it is shown in Figs. 1 and 2 as occupying as is necessary to advance each group of cops through an arc of forty-five degrees of their path of movement.
Figure 4:
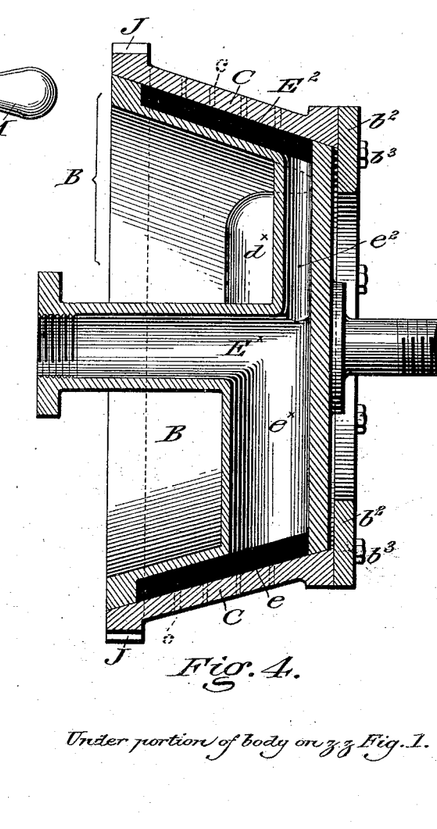
Fig. 4 is a sectional plan of the carrier body, section being supposed in the plane of the dotted line $z$—$z$ of Fig. 1, and sight being taken in the direction of the arrows upon said line.

The bolt apertures in the flange $b^2$ are preferably formed to contain spring chambers $b^4$, Fig. 3, adapted to contain spiral springs $s$ encircling the shanks of the bolts $b^3$. The initial tension of the springs is such that when the cap is first applied it is held off a certain distance from the plane of the head of the carrier body. When, however, the carrier wears upon the body, it can be readjusted by tightening up the cap bolts, compressing the springs, and so forcing up the cap nearer to the web or head, an action of course attended by a permanent compression of the springs corresponding to the distance of the inward movement of the cap.

It is, of course, apparent that the cop carrier represented in the drawings and above described is of conical form only because the body with reference to which it is mounted is itself of conical form, and that both the body and the carrier can be made of cylindric or other preferred form without departure from the invention.

The cop carrier C is provided with series of perforations $c$ passing from its inner to its outer surface, the office of which is to permit the passage of impregnating liquid or exhausting fluid, to or from cops $C^\times$ applied to the exterior of the carrier and as to their hollow cores in communication with said perforations.

The perforations may be of any desired form. Those shown are radial holes $c$ through the cop carrier which are externally threaded to receive hollow nipples G, Fig. 7, fitted to receive removable perforated injection tubes H thrust through cops, and conveniently of a construction invented by me and constituting the subject matter of an application for patent filed by me February 8, 1887, as Serial No. 226,909.

Each nipple G is provided with a notch or seat $g$, and a perforated injection tube H is mounted upon said nipple by being slipped on and retained in place by a spring catch or teat, $h$, punched out of the walls of the tube near its base, and set to project within the bore of said tube so as to operate as a spring-like retaining device adapted to be engaged with said catch. This catch is not essential, but it is convenient when the dyestuff or other liquid is being forced through the spindle and outward through the cop. Instead, however, of employing these nipples the injection tubes, or the cops themselves, may be adapted to be fitted directly to the perforations.

The perforations are conveniently but by no means necessarily arranged in intermittently consecutive groups, each group being composed of a given number, circumferentially considered, of transversely disposed lines or tiers of perforations.

In the drawings I have represented the carrier as equipped with four distinct groups of twenty perforations each, the groups being quartered, so to speak, upon the carrier.

I are screens radially projecting from the cop carrier in immediate advance of each group of perforations. These screens have radial projections exceeding that of the applied cops, and serve to take up, collect, or push aside, the scum accumulating on the surface of the liquid in the tank, and thus keep it off of the cops both as the latter are immersed in and as they emerge from the liquid. The screens preferably as shown, present an angular or beveled face.

Rotation of the desired character may be imparted to the carrier in any convenient manner; a good way is to provide the carrier with a circumferential set of teeth J, and to provide a toothed pinion K of suitable diameter to gear with said teeth. Such a pinion may conveniently be mounted upon an arbor $k$ housed within a boxing L applied to the tank, and equipped with a hand lever M by the aid of which it, the said pinion, and through it the cop carrier, may be rotated.

Other mechanisms may, as stated, be substituted for the foregoing gearing; and, if desired, a stop can be applied to limit the throw of the carrier to a given distance upon each application of power to it.

Such being a description of a preferred form of apparatus adapted to effectuate my invention it will be apparent that it is adapted for the practice of any one of the five processes to which I have hereinbefore referred:—Thus, by throwing the pump or pumps operating in connection with the air-exhausting and the liquid-exhausting conduit or conduits entirely out of action, the process of dyeing scouring, bleaching, or otherwise treating the cops by impregnation of a selected liquid and of replacing the impregnated cops with others to be impregnated,—can be practiced. Thus, again, by shutting off the air-exhausting chamber from communication with either the liquid-exhausting pump or with such separate pump as it may happen to be separately in communication with, the operation of charging or saturation with liquid, liquid-exhaustion and substituting or replacing the cops, can be performed. It is to be remarked that the foregoing operation can, in fact, be performed without discontinuing the operation of air-exhaustion, inasmuch as the said operation, although inert for useful purpose in any operation except that of indigo dyeing, is harmless in any other operation involving saturation. Thus, again by, throwing the charging pump out of operation or by shutting off the charging conduit from communication with said pump, and by removing liquid from the tank, which in such case becomes simply a fixed supporting frame-work, the operation of liquid-exhaustion of cops which have been in any other machine impregnated with the desired liquid, and of replacing said liquid-exhausted cops with fresh cops to be liquid-exhausted, can be performed. Thus again, by shutting off the liquid-exhausting chamber from communication with its pump the operation of air exhaustion, impregnation, and substitution of cops can be performed. Thus, finally, all of the conduits being in communication with their respective pumps, either the operation of air-exhaustion, impregnation, liquid-exhaustion and substitution of cops, or the foregoing operation omitting the step of liquid-exhaustion, can be performed either with readily oxidizable liquid dyestuffs in the operation of dyeing, or with any desired liquid in any selected operation involving saturation of the cops.

The best results are obtained by employing both the liquid-exhausting and the charging pumps as suction pumps, and by operating an independent pump as a suction pump to perform, when desired, the work of air-exhaustion.

Assuming the pumps operated as suction devices, the following is a description of the operation of my apparatus as represented and hereinbefore described, in carrying out the process of charging, impregnation or saturation, liquid-exhaustion, and substitution of charged and liquid-exhausted cops for fresh or untreated cops to be charged and liquid-exhausted,—an operation itself a type of all the others:—

The desired liquid is introduced into the tank to about the level represented in the drawings, that is to say to a level considerably above the dye slots F, and also sufficiently above the air-exhausting chamber to permit of the complete immersion of a tier of radially projecting cops happening to be in registry as to their perforations with said air-exhausting chamber.

The charging pump is conveniently provided with a return pipe so as to return to the tank as much of the liquid employed as is not absorbed by or does not remain in the cops, the liquid being thereby in constant circulation from the tank to the pump and from the pump back to the tank, or vice versa. In other words, a constant circulation takes place through both the charging pump and the cops, and the liquid in the tank is reduced only by such quantity of liquids as remains in the cops. The reduction, however, when carried to an extent affecting the normal level of the supply of dyestuff to the tank is to be compensated for, and the level maintained, by fresh supplies.

The cop carrier being rotated to bring a group of its perforations above the dead face, a cop is by an attendant supplied to each aforesaid perforation, and the carrier is then further rotated, in the direction of the arrow upon it in Fig. 1, a sufficient distance to occasion the complete immersion of the group of cops so applied, and the presentation of the perforations to which they are applied, to the charging chamber: The pump in connection with the charging conduit, being, as is preferred, supposed in operation as a suction pump, thereupon, through the aforesaid perforations of the carrier, through the charging chamber, and through the charging conduit, sucks enough of the liquid contained in the tank through the substance of each of the cops of the immersed group, to occasion the saturation and complete impregnation with said liquid of the threads composing each of said cops: While the charging pump has been acting upon the immersed group of cops referred to, the attendant has supplied to the succeeding group of perforations, (which by that rotation of the carrier which occasioned the immersion of the first group, have come over the dead face) a set of fresh or untreated cops to be charged; and, so soon as he has done this, a further rotation imparted to the carrier will occasion the immersion of the group of last applied unimpregnated cops, and,—disregarding, for the time being, the fact that the charging chamber is represented as double,—such further advance movement of the immersed group of cops first subjected to the action of the charging pump, as will elevate them above the surface of the liquid in the tank and place the perforations to which they are applied in communication with the liquid-exhausting chamber, and,—an air pump being supposed in operation to suck air through the liquid-exhausting conduit,—and consequently in position to be acted upon by the air so, as aforesaid, sucked from out the liquid-exhausting chamber, and thereby to be exhausted of such surplus liquid as they contain at the time of their emergence from the liquid of the tank: A further rotation of the carrier (unnecessary if the mouth of the liquid exhausting conduit be employed as the dead face) will bring the group of cops, so, as aforesaid, liquid-exhausted, over the dead face to permit of their removal by the attendant and of his supplying to the perforations from which they are removed a group of fresh or unimpregnated cops,—will at the same time bring the group of cops last acted upon by the charging pump into communication with the liquid-exhausting pump to the liquid-exhausted, and bring the group of cops, applied while the group referred to was being liquid-exhausted, into connection with the charging pump to be charged.

A continuance, more or less rapid at will, of the foregoing operation constitutes a practice of that process of which impregnation, liquid-exhaustion, and substitution are the steps and which, as an entirety, is perhaps the most important process which my machine is adapted to effectuate. When liquid-exhaustion is not desired, or is intended to be performed on another machine, the liquid-exhausting chamber is cut off or its pump thrown out of action, and the foregoing described operation then becomes an operation simply of charging and cop-replacing.

In the apparatus represented, the charging chamber being double, or having circumferential extent of almost 180°, affords the additional advantage of presenting the same group of cops as it were twice, or at least for double the period of time, to the action of the charging pump,—each succeeding group first stopping over the first compartment of said charging chamber long enough to admit of the removal of the group last liquid-exhausted and the application of a fresh group of cops, and then stopping over the second compartment for a similar length of time. Of course, however, it is apparent that a charging chamber of less extent than that shown may be employed, in which event instead of providing the cop carrier with four groups of perforations I would provide it with but three.

I prefer, as stated, to conduct both of the foregoing operations by sucking both the charging liquids and the air from the outer surfaces of the cops inward, but it is obvious that the same result can be secured by forcing impregnating liquid and liquid-exhausting fluid from the core of the cops outwardly to their surfaces. I prefer also to use pumps strictly as such to force or suck the liquids and fluids utilized, but any other forcing or liquid-exhausting devices may be employed in the stead of pumps, and in the claims, where reference is made to them, I use the word pump generically.

When easily oxidizable liquid dyes, such, for instance, as indigo white solution, are employed in indigo dyeing, it is important to keep air out of the solution to prevent its combining with the white indigo to form insoluble indigotine, and therefore it is of advantage to extract or exhaust the air from the cops before subjecting them to the action of the charging conduit; because, otherwise, the insoluble indigotine, being sucked or forced into the cops by the action of the charging pump, would clog the fibers of the cops, and prevent the proper circulation of the dyestuff through said cops in the operation of charging proper. This I conveniently accomplish by the aid of the air-exhausting chamber $E^2$ hereinbefore referred to, the perforations constituting each transverse tier of perforations of a given group of cops, coming in turn over said air-exhausting chamber as the carrier is rotated to occasion the complete immersion of the group in question, and thereby occasioning the subjection of the cops of such tier to the action of an air-exhausting pump,—that is to say, to an air suction,—before the cops of the tier in question come in communication with the charging chamber, and in such communication are, as stated, subjected to the action of the charging pump.

It will be apparent that in conducting the foregoing operation the cops will become more or less filled with the indigo solution. The period during which a given tier presents over the air-exhausting chamber is, however, in the movement of the carrier, so limited that no impregnation saturation or charging proper, in the sense of a thorough circulation of liquid through the cops, takes place; and the operation of air-exhaustion is not, therefore, one of charging or saturation in the sense in which those terms are, in this specification, employed as applied to the operations conducted through the medium of the charging chamber by the action of the charging pump. Such of the dyestuff, moreover, as is, by the operation of the air-exhausting pump, drawn through the cops and into the air-exhausting chamber, and as has become oxidized, is not, as is apparent, admitted into the tank at all, but is drawn off to the air-exhausting pump, from which, in practice, it is discharged into a special vessel and deoxidized before being again supplied to the tank.

The air exhausting chamber may be employed either with or without the liquid-exhausting chamber, the latter being either active or inert at the will of the operator, conveniently by the aid of the cock upon the branch tube $e^x$.

Of course, as stated, the air-exhausting and the liquid-exhausting chambers may be connected with separate pumps.

In order to employ my apparatus for scouring, bleaching, steaming, mordanting, or washing yarn in cops, it is apparent that it will be only necessary to supply the desired bleaching or other selected liquid to the tank and charging pump, and to repeat in connection with such liquid the operation already described. If desired, the liquid-exhausting pump can be replaced by an injector or kindred device employed to inject steam through the cops, or the apparatus being placed in a hot chamber the liquid-exhausting pump may be used to exhaust or draw hot air through them.

In order to be of the greatest commercial value it is desirable that the various steps of any one of my processes should be rapidly and continuously performed, but both speed and continuity are to be relatively considered, and the term continuous in the claims is used in a relative sense.

Having thus described my invention, I claim:—

1. The continuous process of dyeing, scouring, bleaching, or otherwise treating a series of cops, hereinbefore described, which consists in the contemporaneous but distributive subjection of said cops each in turn to its appropriate step of the following contemporaneously-conducted successive steps or operations, namely: first, saturation or impregnation by sucking or forcing dyeing, bleaching, or other selected liquids through given cops; and, second, substitution of cops to be impregnated for given impregnated cops, substantially as set forth.

2. The continuous process of dyeing, scouring, bleaching, or otherwise treating a series of cops, hereinbefore described, which consists in the contemporaneous but distributive subjection of said cops each in turn to its appropriate step of the following contemporaneously conducted successive steps or operations, namely:—first, saturation or impregnation by sucking or forcing dyeing, bleaching, or other selected liquids through given cops; second, liquid exhaustion by forcing or sucking air or other suitable fluid through given impregnated cops; and, third, substitution of cops to be impregnated and liquid-exhausted for given impregnated and liquid-exhausted cops, substantially as set forth.

3. The continuous process of liquid-exhausting a series of cops, hereinbefore described, which consists in the contemporaneous but distributive subjection of said cops each in turn to its appropriate step of the following contemporaneously-conducted successive steps or operations, namely: first, liquid-exhaustion by forcing or sucking air, or other suitable fluid, through given cops; and, second, substitution of cops to be liquid-exhausted for given liquid-exhausted cops, substantially as set forth.

4. The continuous process of dyeing with easily oxidizable liquid dies, a series of cops, hereinbefore described, which consists in the contemporaneous but distributive subjection of said cops each in turn to its appropriate step of the following contemporaneously-conducted successive steps or operations, namely: first, air-exhaustion by sucking air from out given cops to be dyed; second, saturation or impregnation by sucking or forcing dyeing liquid through given air-exhausted cops; and, third, substitution of cops to be air-exhausted and impregnated for given air-exhausted and impregnated cops, substantially as set forth.

5. The continuous process of dyeing with easily oxidizable liquid dyes, a series of cops, hereinbefore described, which consists in the contemporaneous but distributive subjection of said cops each in turn to its appropriate step of the following contemporaneously conducted successive steps or operations, namely: first, air-exhaustion by sucking air from out given cops to be dyed; second, saturation or impregnation by sucking or forcing dyeing liquid through given air-exhausted cops; third, liquid-exhaustion by forcing or sucking air or other suitable fluid through given air-exhausted and impregnated cops; and, fourth, substitution of cops to be air-exhausted, impregnated, and liquid-exhausted, for given air-exhausted, impregnated, and liquid-exhausted cops, substantially as set forth.

6. In combination, a rotatable cop carrier having perforations in communication with which cops are applied to said carrier, and one or more fixed conduits over the mouths of which the perforations of the carrier are caused to present as the carrier is caused to rotate, substantially as and for the purposes specified.

7. In an apparatus for dyeing, bleaching, or otherwise treating yarn in cops, the following instrumentalities in combination: first, a fixed tank; second, a perforated rotatable cop carrier; third, a charging conduit in communication with a charging pump; and, fourth, a dead face; substantially as set forth.

8. In an apparatus for dyeing, bleaching, and otherwise treating yarn in cops, the following instrumentalities in combination:— first, a fixed tank; second, a perforated rotatable cop carrier; third, a charging conduit in communication with a charging pump; and, fourth, a liquid-exhausting conduit in communication with a liquid-exhausting pump; substantially as set forth.

9. In an apparatus for dyeing, bleaching, and otherwise treating yarn in cops, the following instrumentalities in combination:— first, a fixed tank; second, a perforated rotatable cop carrier; third, a charging conduit in communication with a charging pump; fourth, a liquid-exhausting conduit in communication with a liquid-exhausting pump; and, fifth, a dead face, substantially as set forth.

10. In an apparatus for treating yarn in cops, the following instrumentalities in combination:—first, a fixed frame-work; second, a perforated rotatable cop carrier; and, third, a liquid-exhausting conduit in communication with a liquid-exhausting pump, substantially as set forth.

11. In an apparatus for treating yarn in cops, the following instrumentalities in combination: first, a fixed frame-work; second, a perforated rotatable cop carrier; third, a liquid-exhausting conduit in communication with a liquid-exhausting pump; and, fourth, a dead face, substantially as set forth.

12. In an apparatus for treating yarn in cops, the following instrumentalities in combination: first, a fixed frame-work; second, a perforated rotatable cop carrier; third, a liquid-exhausting conduit in communication with a liquid-exhausting pump; fourth, a dead face; and, fifth, mechanism, essentially for instance, such as set forth, for imparting to the cop carrier a predetermined movement relative to the framework, liquid-exhausting conduit, and dead face, substantially as set forth.

13. In an apparatus for dyeing, bleaching, and otherwise treating yarn in cops, the following instrumentalities in combination:— first, a fixed tank; second, a perforated rotatable cop carrier; third, a charging conduit in communication with a charging pump; fourth, a dead face; and, fifth, mechanism, essentially, for instance, such as set forth, for imparting to the cop carrier a predetermined movement relative to the tank, charging conduit, and dead face, substantially as set forth.

14. In an apparatus for dyeing, bleaching, and otherwise treating yarn in cops, the following instrumentalities in combination: first, a fixed tank; second, a perforated rotatable cop carrier; third, a charging conduit in communication with a charging pump; fourth a liquid-exhausting conduit in communication with a liquid-exhausting pump; fifth, a dead face; and, sixth, mechanism, essentially, for instance, such as set forth, for imparting to the cop carrier a predetermined movement relative to the tank, charging conduit, liquid-exhausting conduit, and dead face, substantially as set forth.

15. In an apparatus for dyeing, bleaching, and otherwise treating yarn in cops, the following instrumentalities in combination:—first, a fixed tank; second, a perforated rotatable cop carrier; third, a charging conduit in communication with a charging pump; fourth, a dead face; fifth, a carrier body; and, sixth, mechanism, essentially, for instance, such as set forth, for imparting to the cop carrier a predetermined movement relative to the tank, charging conduit, and dead face, substantially as set forth.

16. In an apparatus for dyeing, bleaching, and otherwise treating yarn in cops; the following instrumentalities in combination:—first, a fixed tank; second, a perforated rotatable cop carrier; third, a charging conduit in communication with a charging pump; fourth, a liquid-exhausting conduit in communication with a liquid-exhausting pump; fifth, a dead face; sixth, a carrier body; and, seventh, mechanism, essentially, for instance, such as set forth, for imparting to the cop carrier a predetermined movement relative to the tank, charging conduit, liquid-exhausting conduit, and dead face, substantially as set forth.

17. In an apparatus for dyeing yarn in cops, the following instrumentalities in combination:—first, a fixed tank; second, a perforated rotatable cop carrier; third, an air-exhausting chamber in communication with an air-exhausting device; fourth, a charging conduit in communication with a charging pump; fifth, a dead face; and, sixth, a carrier body substantially as set forth.

18. In an apparatus for dyeing yarn in cops, the following instrumentalities in combination:—first, a fixed tank; second, a perforated rotatable cop carrier; third, an air-exhausting chamber in communication with an air-exhausting device; fourth, a charging conduit in communication with a charging pump; fifth, a liquid-exhausting conduit in communication with a liquid-exhausting pump; sixth, a dead face; and, seventh, a carrier body, substantially as set forth.

19. In an apparatus for dyeing, bleaching, and otherwise treating yarn in cops, the following instrumentalities in combination:—first, a tank to contain dyeing, bleaching, or other desired liquid; second, a perforated rotatable cop carrier adapted to be supplied with removably applied cops; third, a charging conduit in exterior communication with a suction or pressure pump and in interior communication with given perforations in the cop carrier; fourth, a dead face to act in connection with other given perforations of the cop carrier; and, fifth, suitable means, such, for instance, as the carrier body B, for maintaining the foregoing instrumentalities in their given relative disposition, substantially as set forth.

20. In an apparatus for dyeing, bleaching, and otherwise treating yarn in cops, the following instrumentalities in combination:—first, a tank to contain dyeing, bleaching, or other desired liquid; second, a perforated rotatable cop carrier adapted to be supplied with removably applied cops; third, a charging conduit in exterior communication with a suction or pressure pump and in interior communication with given perforations in the cop carrier; fourth, a liquid-exhausting conduit in exterior communication with a liquid-exhausting pump and in interior communication with other given perforations in the cop carrier; fifth, a dead face to act in connection with yet other given perforations of the cop carrier; and, sixth, suitable means such, for instance, as the carrier body B, for maintaining the foregoing instrumentalities in their given relative disposition, substantially as set forth.

21. In an apparatus for dyeing, bleaching, and otherwise treating yarn in cops, the following instrumentalities in combination: first, a tank to contain dyeing, bleaching, or other desired liquid; second, a perforated rotatable cop carrier adapted to be supplied with removably applied cops; third, a charging conduit in exterior communication with a suction or pressure pump and in interior communication with given perforations in the cop carrier; fourth, a dead face to act in connection with other given perforations of the cop carrier; and, fifth, a carrier body with reference to which the cop carrier rotates, which has a chamber in communication with the charging conduit, and which also embodies the aforesaid dead face, substantially as and for the purposes set forth.

22. In an apparatus for dyeing, bleaching, and otherwise treating yarn in cops, the following instrumentalities in combination:—first, a tank to contain dyeing, bleaching, or other desired liquid; second, a perforated rotatable cop carrier adapted to be supplied with removably applied cops; third, a charging conduit in exterior communication with a suction or pressure pump and in interior communication with given perforations in the cop carrier; fourth, a liquid-exhausting conduit in exterior communication with a liquid-exhausting pump and in interior communication with other given perforations in the cop carrier; fifth, a dead face to act in connection with yet other given perforations of the cop carrier; and, sixth, a carrier body with reference to which the cop carrier rotates; which has a chamber in communication with the charging conduit and a chamber in communication with the liquid-exhausting conduit, and which embodies the aforesaid dead face, substantially as and for the purposes set forth.

23. In an apparatus for dyeing, bleaching, and otherwise treating yarn in cops, the following instrumentalities in combination:—first, a tank for containing liquid; second, a carrier body fixedly mounted referably to the tank and partly within said tank; third, a rotatable perforated cop carrier adapted to be supplied with removably applied cops, and which is rotated with respect to said carrier body; fourth, a charging conduit in communication with a charging pump, and, through the intervention of the carrier body, with given perforations in the cop carrier; and, fifth, a dead face through the intervention of said carrier body presented to given perforations of the cop carrier, substantially as and for the purposes set forth.

24. In an apparatus for dyeing, bleaching, and otherwise treating yarn in cops, the following instrumentalities in combination:—first, a tank for containing liquid; second, a carrier body fixedly mounted referably to the tank and partly within said tank; third, a rotatable perforated cop carrier adapted to be supplied with removably applied cops, and which is rotated with respect to said carrier body; fourth, a charging conduit in communication with a charging pump, and, through the intervention of the carrier body, with given perforations in the cop carrier; fifth, a liquid-exhausting conduit in communication with a liquid-exhausting pump, and, through the intervention of said carrier body, with given perforations in the cop carrier; and, sixth, a dead face through the intervention of said carrier body presented to given perforations of the cop carrier; substantially as and for the purpose set forth.

25. In an apparatus for dyeing yarn in cops, the following instrumentalities in combination:—first, a fixed tank; second, a perforated rotatable cop carrier; third, an air-exhausting conduit in communication with an air-exhausting pump; fourth, a charging conduit in communication with a charging pump; fifth, a liquid-exhausting conduit in communication with a liquid-exhausting pump; sixth, a dead face; seventh, suitable means, essentially such as set forth, for disconnecting or cutting off the air-exhausting conduit and the liquid-exhausting conduit, separately or together, from the pump or pumps in connection with which they operate, substantially as set forth.

26. In an apparatus for dyeing, bleaching and otherwise treating yarn in cops, screens, in combination with a cop carrier adapted to be supplied with cops, substantially as and for the purpose specified.

27. In a machine of the class herein recited, in combination with a rotatable cop carrier having perforations, hollow nipples provided with spindle-retaining catches and applied to said perforations, substantially as and for the purpose specified.

28. In a machine of the class herein recited, the combination of a fixed tank, a carrier body, a cop carrier having movement referably to said carrier body, and dye slots formed in the carrier body, substantially as and for the purposes set forth.

In testimony whereof I have hereunto signed my name this 9th day of April, A. D. 1887.

AUGUST GRAEMIGER.

In presence of—
    JOHN F. LONSDALE,
    HENRY BOWEN.

It is hereby certified that in Letters Patent No. 368,715, granted August 23, 1887, upon the application of August Graemiger, of Crompton, Rhode Island, for an improvement in the "Process of and Apparatus for Dyeing, Scouring, Bleaching, and Otherwise Treating Yarns in Cops," errors appear requiring the following corrections, viz: In line 134, page 7, of the printed specification, the word "the" should read *be;* and in line 43, page 9, the word "dies" should read *dyes;* and that the Letters Patent should be read with these corrections therein to make it conform to the record of the case in the Patent Office.

Signed, countersigned, and sealed, this 6th day of September, A. D. 1887.

[SEAL.]
D. L. HAWKINS,
*Acting Secretary of the Interior.*

Countersigned:
BENTON J. HALL,
*Commissioner of Patents.*